US009501894B2

(12) United States Patent
Hughes et al.

(10) Patent No.: US 9,501,894 B2
(45) Date of Patent: Nov. 22, 2016

(54) GAMING SYSTEM AND METHOD FOR TRIGGERING A SECONDARY GAME IN ASSOCIATION WITH MULTIPLE CONCURRENTLY PLAYED PRIMARY GAMES

(71) Applicant: IGT, Las Vegas, NV (US)

(72) Inventors: William Keith Hughes, Reno, NV (US); Kimberly N. Rogers, Reno, NV (US); Christian D. Gerchak, Sparks, NV (US)

(73) Assignee: IGT, Las Vegas, NV (US)

(*) Notice: Subject to any disclaimer, the term of this patent is extended or adjusted under 35 U.S.C. 154(b) by 0 days.

(21) Appl. No.: 14/955,783

(22) Filed: Dec. 1, 2015

(65) Prior Publication Data

US 2016/0086435 A1 Mar. 24, 2016

Related U.S. Application Data

(63) Continuation of application No. 14/025,501, filed on Sep. 12, 2013, now Pat. No. 9,208,648.

(51) Int. Cl.

*A63F 13/00* (2014.01)
*G07F 17/32* (2006.01)

(52) U.S. Cl.

CPC ......... *G07F 17/3223* (2013.01); *G07F 17/326* (2013.01); *G07F 17/3239* (2013.01); *G07F 17/3244* (2013.01); *G07F 17/3248* (2013.01); *G07F 17/3255* (2013.01); *G07F 17/3258* (2013.01); *G07F 17/3262* (2013.01); *G07F 17/3267* (2013.01)

(58) Field of Classification Search

None

See application file for complete search history.

(56) References Cited

U.S. PATENT DOCUMENTS

| | | | |
|---|---|---|---|
| 4,448,419 | A | 5/1984 | Telnaes |
| 4,467,424 | A | 8/1984 | Hedges et al. |
| 4,621,814 | A | 11/1986 | Stepan et al. |
| 4,624,459 | A | 11/1986 | Kaufman |
| 4,669,730 | A | 6/1987 | Small |
| 4,679,143 | A | 7/1987 | Hagiwara |
| 4,695,053 | A | 9/1987 | Vazquez, Jr. et al. |
| 4,710,873 | A | 12/1987 | Breslow et al. |
| 4,743,002 | A | 5/1988 | Menzel |

(Continued)

FOREIGN PATENT DOCUMENTS

| | | |
|---|---|---|
| GB | 2084371 | 9/1980 |
| GB | 2066991 | 7/1981 |

(Continued)

OTHER PUBLICATIONS

Jazzy Jackpots Advertisements written by Atronic, published in 2000.

(Continued)

*Primary Examiner* — Jason Yen

(74) *Attorney, Agent, or Firm* — Neal, Gerber & Eisenberg LLP

(57) ABSTRACT

A gaming system and method for enabling a player to select a plurality of games to simultaneously, concurrently or overlappingly play, wherein regardless or independent of which primary games the player selected to play, the secondary games available to be triggered remain the same.

17 Claims, 11 Drawing Sheets

(56) References Cited

U.S. PATENT DOCUMENTS

| | | | |
|---|---|---|---|
| 4,838,552 | A | 6/1989 | Hagiwara |
| 4,856,787 | A | 8/1989 | Itkis |
| 4,874,173 | A | 10/1989 | Kishishita |
| 4,922,522 | A | 5/1990 | Scanlon |
| 4,926,327 | A | 5/1990 | Sidley |
| 4,991,848 | A | 2/1991 | Greenwood et al. |
| 5,019,973 | A | 5/1991 | Wilcox et al. |
| 5,116,055 | A | 5/1992 | Tracy |
| 5,152,529 | A | 10/1992 | Okada |
| 5,159,549 | A | 10/1992 | Hallman, Jr. et al. |
| 5,178,390 | A | 1/1993 | Okada |
| 5,179,517 | A | 1/1993 | Sarbin et al. |
| 5,209,476 | A | 5/1993 | Eiba |
| 5,248,142 | A | 9/1993 | Breeding |
| 5,249,800 | A | 10/1993 | Hilgendorf et al. |
| 5,259,613 | A | 11/1993 | Marnell, II |
| 5,275,400 | A | 1/1994 | Weingardt et al. |
| 5,277,424 | A | 1/1994 | Wilms |
| 5,288,081 | A | 2/1994 | Breeding |
| 5,324,035 | A | 6/1994 | Morris et al. |
| 5,342,047 | A | 8/1994 | Heidel et al. |
| 5,344,144 | A | 9/1994 | Canon |
| 5,370,399 | A | 12/1994 | Liverance |
| 5,371,345 | A | 12/1994 | LeStrange et al. |
| 5,377,973 | A | 1/1995 | Jones et al. |
| 5,390,934 | A | 2/1995 | Grassa |
| 5,393,061 | A | 2/1995 | Manship et al. |
| 5,393,067 | A | 2/1995 | Paulsen et al. |
| 5,395,111 | A | 3/1995 | Inoue |
| 5,395,242 | A | 3/1995 | Slye et al. |
| 5,397,128 | A | 3/1995 | Hesse et al. |
| 5,411,258 | A | 5/1995 | Wilson et al. |
| 5,415,416 | A | 5/1995 | Scagnelli et al. |
| 5,450,938 | A | 9/1995 | Rademacher |
| 5,456,465 | A | 10/1995 | Durham |
| 5,470,079 | A | 11/1995 | LeStrange et al. |
| 5,472,194 | A | 12/1995 | Breeding et al. |
| 5,524,888 | A | 6/1996 | Heidel |
| 5,544,892 | A | 8/1996 | Breeding |
| 5,564,700 | A | 10/1996 | Celona |
| 5,569,084 | A | 10/1996 | Nicastro et al. |
| 5,570,885 | A | 11/1996 | Ornstein |
| 5,580,309 | A | 12/1996 | Piechowiak et al. |
| 5,584,764 | A | 12/1996 | Inoue |
| 5,593,349 | A | 1/1997 | Miguel et al. |
| 5,609,524 | A | 3/1997 | Inoue |
| 5,611,730 | A | 3/1997 | Weiss |
| 5,639,088 | A | 6/1997 | Schneider et al. |
| 5,655,961 | A | 8/1997 | Acres et al. |
| 5,673,917 | A | 10/1997 | Vancura |
| 5,674,128 | A | 10/1997 | Holch et al. |
| 5,697,843 | A | 12/1997 | Manship et al. |
| 5,704,835 | A | 1/1998 | Dietz, II |
| 5,707,286 | A | 1/1998 | Carlson |
| 5,711,525 | A | 1/1998 | Breeding |
| 5,722,891 | A | 3/1998 | Inoue |
| 5,759,103 | A | 6/1998 | Freels et al. |
| 5,761,647 | A | 6/1998 | Boushy |
| 5,770,533 | A | 6/1998 | Franchi |
| 5,775,692 | A | 7/1998 | Watts et al. |
| 5,788,230 | A | 8/1998 | Krise et al. |
| 5,788,574 | A | 8/1998 | Ornstein et al. |
| 5,816,915 | A | 10/1998 | Kadlik |
| 5,839,730 | A | 11/1998 | Pike |
| 5,848,932 | A | 12/1998 | Adams |
| 5,873,781 | A | 2/1999 | Keane |
| 5,890,962 | A | 4/1999 | Takemoto |
| 5,947,820 | A | 9/1999 | Morro et al. |
| 5,947,821 | A | 9/1999 | Stone |
| 5,967,896 | A | 10/1999 | Jorach et al. |
| 5,984,779 | A | 11/1999 | Bridgeman et al. |
| 5,984,781 | A | 11/1999 | Sunaga |
| 5,984,782 | A | 11/1999 | Inoue |
| 6,001,016 | A | 12/1999 | Walker et al. |
| 6,012,982 | A | 1/2000 | Piechowiak et al. |
| 6,019,374 | A | 2/2000 | Breeding |
| 6,024,642 | A | 2/2000 | Stupak |
| 6,033,307 | A | 3/2000 | Vancura |
| 6,039,648 | A | 3/2000 | Guinn et al. |
| 6,047,963 | A | 4/2000 | Pierce et al. |
| 6,056,641 | A | 5/2000 | Webb |
| 6,059,289 | A | 5/2000 | Vancura |
| 6,062,980 | A | 5/2000 | Luciano |
| 6,068,552 | A | 5/2000 | Walker et al. |
| 6,077,162 | A | 6/2000 | Weiss |
| 6,102,400 | A | 8/2000 | Scott et al. |
| 6,126,542 | A | 10/2000 | Fier |
| 6,142,874 | A | 11/2000 | Kodachi et al. |
| 6,146,273 | A | 11/2000 | Olsen |
| 6,149,157 | A | 11/2000 | Saun |
| 6,149,522 | A | 11/2000 | Alcorn et al. |
| 6,159,095 | A | 12/2000 | Frohm et al. |
| 6,159,097 | A | 12/2000 | Gura |
| 6,159,098 | A | 12/2000 | Slomiony et al. |
| 6,179,710 | B1 | 1/2001 | Sawyer et al. |
| 6,186,894 | B1 | 2/2001 | Mayeroff |
| 6,190,255 | B1 | 2/2001 | Thomas et al. |
| 6,203,427 | B1 | 3/2001 | Walker et al. |
| 6,203,429 | B1 | 3/2001 | Demar et al. |
| 6,210,275 | B1 | 4/2001 | Olsen |
| 6,210,279 | B1 | 4/2001 | Dickinson |
| 6,224,483 | B1 | 5/2001 | Mayeroff |
| 6,227,969 | B1 | 5/2001 | Yoseloff |
| 6,227,971 | B1 | 5/2001 | Weiss |
| 6,234,900 | B1 | 5/2001 | Cumbers |
| 6,254,481 | B1 | 7/2001 | Jaffe et al. |
| 6,264,561 | B1 | 7/2001 | Saffari et al. |
| 6,270,412 | B1 | 8/2001 | Crawford et al. |
| 6,290,600 | B1 | 9/2001 | Glasson |
| 6,302,790 | B1 | 10/2001 | Brossard |
| 6,309,300 | B1 | 10/2001 | Glavich |
| 6,315,664 | B1 | 11/2001 | Baerlocher et al. |
| 6,315,666 | B1 | 11/2001 | Mastera et al. |
| 6,319,125 | B1 | 11/2001 | Acres |
| 6,328,649 | B1 | 12/2001 | Randall |
| 6,336,857 | B1 | 1/2002 | McBride |
| 6,361,441 | B1 | 3/2002 | Walker et al. |
| 6,379,248 | B1 | 4/2002 | Jorasch et al. |
| 6,394,907 | B1 | 5/2002 | Rowe |
| 6,398,645 | B1 | 6/2002 | Yoseloff |
| 6,413,162 | B1 | 7/2002 | Baerlocher et al. |
| 6,425,823 | B1 | 7/2002 | Byrne |
| 6,431,983 | B2 | 8/2002 | Acres |
| 6,443,841 | B1 | 9/2002 | Rossides |
| 6,461,241 | B1 | 10/2002 | Webb et al. |
| 6,517,073 | B1 | 2/2003 | Vancura |
| 6,523,829 | B1 | 2/2003 | Walker et al. |
| 6,549,912 | B1 | 4/2003 | Chen |
| 6,554,709 | B1 | 4/2003 | Brenner et al. |
| 6,558,255 | B2 | 5/2003 | Walker |
| 6,565,436 | B1 | 5/2003 | Baerlocher |
| 6,569,016 | B1 | 5/2003 | Baerlocher |
| 6,579,179 | B2 | 6/2003 | Poole et al. |
| 6,595,855 | B2 | 7/2003 | Sako |
| 6,607,195 | B2 | 8/2003 | Vancura |
| 6,607,441 | B1 | 8/2003 | Acres |
| 6,634,943 | B1 | 10/2003 | Baerlocher |
| 6,645,071 | B2 | 11/2003 | Perrie et al. |
| 6,648,759 | B2 | 11/2003 | Vancura |
| 6,652,378 | B2 | 11/2003 | Cannon et al. |
| 6,656,040 | B1 | 12/2003 | Brosnan et al. |
| 6,679,497 | B2 | 1/2004 | Walker et al. |
| 6,682,420 | B2 | 1/2004 | Webb et al. |
| 6,685,567 | B2 | 2/2004 | Cockerille et al. |
| 6,692,003 | B2 | 2/2004 | Potter et al. |
| 6,702,289 | B1 | 3/2004 | Feola |
| 6,712,693 | B1 | 3/2004 | Hettinger |
| 6,722,985 | B2 | 4/2004 | Criss-Puszkiewicz et al. |
| 6,726,565 | B2 | 4/2004 | Hughs-Baird |
| 6,780,111 | B2 | 8/2004 | Cannon et al. |
| 6,789,801 | B2 | 9/2004 | Snow |
| 6,804,763 | B1 | 10/2004 | Stockdale et al. |
| 6,832,957 | B2 | 12/2004 | Falconer |
| 6,835,134 | B2 | 12/2004 | Poole et al. |

(56) References Cited

U.S. PATENT DOCUMENTS 6,837,788 B2 1/2005 Cannon
6,860,810 B2 3/2005 Cannon et al.
6,863,608 B1 3/2005 LeMay et al.
6,866,586 B2 3/2005 Oberberger et al.
6,884,165 B2 4/2005 Baerlocher
6,981,917 B2 1/2006 Webb et al.
6,986,709 B2 1/2006 Hughs-Baird et al.
6,991,538 B2 1/2006 Cannon
6,997,805 B2 2/2006 Vancura
7,029,395 B1 4/2006 Baerlocher
7,111,845 B2 9/2006 Walker et al.
7,131,908 B2 11/2006 Baerlocher
7,156,735 B2 1/2007 Brosnan et al.
7,201,654 B1 4/2007 Jarvis et al.
7,278,919 B2 10/2007 Souza et al.
7,297,059 B2 11/2007 Vancura et al.
7,311,605 B2 12/2007 Moser
7,329,179 B2 2/2008 Baerlocher
7,341,518 B2 3/2008 Muskin
7,351,146 B2 4/2008 Kaminkow
7,371,174 B2 5/2008 Baerlocher
7,399,228 B2 7/2008 Baerlocher
7,513,827 B2 4/2009 Baerlocher
7,513,828 B2 4/2009 Nguyen et al.
7,547,252 B2 6/2009 Peterson et al.
7,594,851 B2 9/2009 Falconer
7,597,618 B2 10/2009 Webb et al.
7,611,411 B2 11/2009 Griswold et al.
7,614,947 B2 11/2009 Baerlocher et al.
7,617,151 B2 11/2009 Rowe
7,758,417 B2 7/2010 Jorasch et al.
7,780,517 B2 8/2010 Saffari et al.
7,806,764 B2 10/2010 Brosnan et al.
7,815,503 B2 10/2010 Walker et al.
7,850,522 B2 12/2010 Walker et al.
7,867,080 B2 1/2011 Nicely et al.
7,871,323 B2 1/2011 Walker et al.
7,874,904 B2 1/2011 Randall
7,901,294 B2 3/2011 Walker et al.
7,914,373 B2 3/2011 Webb et al.
7,927,212 B2 4/2011 Hedrick et al.
7,988,549 B2 8/2011 Little
7,988,551 B2 8/2011 Walker et al.
8,016,657 B2 9/2011 Walker et al.
8,016,679 B2 9/2011 Steil et al.
8,128,492 B2 3/2012 Vasquez et al.
8,157,633 B2 4/2012 Kaminkow
8,246,443 B2 8/2012 Randall
8,333,657 B1 12/2012 Nelson et al.
8,403,740 B2 3/2013 Kovacs et al.
8,408,990 B2 4/2013 De Waal et al.
8,449,390 B2 5/2013 Kaminkow
8,475,261 B2 7/2013 Little
8,500,551 B2 8/2013 Baerlocher et al.
8,512,120 B2 8/2013 Nelson et al.
8,672,750 B2 3/2014 Nelson et al.
2002/0010018 A1 1/2002 Lemay et al.
2002/0025850 A1 2/2002 Hafezi
2002/0039918 A1 4/2002 Anderson et al.
2002/0077167 A1 6/2002 Merari
2003/0027628 A1 2/2003 Luciano
2003/0073497 A1 4/2003 Nelson
2003/0137110 A1 7/2003 Huard et al.
2003/0144053 A1 7/2003 Michaelson
2003/0203756 A1 10/2003 Jackson
2004/0002379 A1 1/2004 Parrott et al.
2004/0005919 A1 1/2004 Walker et al.
2004/0043815 A1* 3/2004 Kaminkow ......... G07F 17/3244 463/25
2004/0063492 A1 4/2004 Baerlocher et al.
2004/0070146 A1 4/2004 Snow
2004/0084843 A1 5/2004 Snow
2004/0087369 A1 5/2004 Tanaka et al.
2004/0090003 A1 5/2004 Snow
2004/0090005 A1 5/2004 Snow
2004/0106446 A1* 6/2004 Cannon ................... G07F 17/32 463/16
2004/0147314 A1 7/2004 LeMay et al.
2004/0152509 A1 8/2004 Hornik et al.
2004/0192431 A1 9/2004 Singer et al.
2004/0219968 A1 11/2004 Fiden et al.
2005/0054431 A1 3/2005 Walker et al.
2005/0085288 A1 4/2005 Schugar et al.
2005/0107158 A1 5/2005 Kanisawa et al.
2005/0153778 A1 7/2005 Nelson et al.
2005/0192099 A1 9/2005 Nguyen et al.
2005/0233794 A1 10/2005 Cannon et al.
2005/0233803 A1 10/2005 Yang
2005/0239542 A1 10/2005 Olsen
2006/0035707 A1 2/2006 Nguyen et al.
2006/0040732 A1 2/2006 Baerlocher et al.
2006/0046823 A1 3/2006 Kaminkow et al.
2006/0073882 A1 4/2006 Rozkin et al.
2006/0073884 A1 4/2006 Walker et al.
2006/0092019 A1 5/2006 Fallon
2006/0128457 A1 6/2006 Cannon
2006/0148547 A1 7/2006 Montgomery et al.
2006/0154722 A1 7/2006 Walker et al.
2006/0211473 A1 9/2006 Walker et al.
2006/0247010 A1 11/2006 Gagner
2006/0252508 A1 11/2006 Walker et al.
2006/0252546 A1 11/2006 Castellari et al.
2007/0054726 A1 3/2007 Muir et al.
2007/0060314 A1 3/2007 Baerlocher et al.
2007/0060321 A1 3/2007 Vasquez et al.
2007/0102877 A1 5/2007 Personius et al.
2007/0155482 A1 7/2007 Walker et al.
2007/0155483 A1 7/2007 Walker et al.
2007/0155484 A1 7/2007 Walker et al.
2007/0191088 A1 8/2007 Breckner et al.
2007/0202941 A1 8/2007 Miltenberger et al.
2007/0243925 A1 10/2007 LeMay et al.
2007/0265094 A1 11/2007 Tone et al.
2007/0273097 A1 11/2007 Kirkutis
2007/0275777 A1 11/2007 Walker et al.
2007/0293293 A1 12/2007 Baerlocher et al.
2007/0293306 A1 12/2007 Nee et al.
2008/0009334 A1* 1/2008 Walker .................... G07F 17/32 463/16
2008/0067745 A1 3/2008 Wikstrom
2008/0076496 A1 3/2008 Baerlocher et al.
2008/0076503 A1 3/2008 Mattice et al.
2008/0076531 A1 3/2008 Baerlocher et al.
2008/0076532 A1 3/2008 Graham et al.
2008/0076542 A1 3/2008 Iddings et al.
2008/0102934 A1 5/2008 Tan
2008/0108425 A1 5/2008 Oberberger
2008/0146344 A1 6/2008 Rowe et al.
2008/0176635 A1 7/2008 Randall
2008/0182650 A1 7/2008 Randall et al.
2009/0069063 A1* 3/2009 Thomas .............. G07F 17/3244 463/16
2009/0098933 A1 4/2009 Walker et al.
2009/0111574 A1 4/2009 Rowe
2009/0203422 A1 8/2009 Ellis
2009/0209333 A1 8/2009 Kelly et al.
2010/0016062 A1 1/2010 Baerlocher
2010/0056263 A1 3/2010 McNee
2010/0120506 A1 5/2010 Davis et al.
2010/0151937 A1 6/2010 Tallal, Jr.
2010/0197394 A1 8/2010 Imachi et al.
2010/0210353 A1 8/2010 Gagner et al.
2010/0210364 A1 8/2010 York et al.
2010/0248821 A1 9/2010 Jorasch et al.
2011/0045892 A1 2/2011 Vann et al.
2011/0111842 A1 5/2011 Walker et al.
2012/0202592 A1* 8/2012 Sprinkle ............. G07F 17/3211 463/30

(56) References Cited

U.S. PATENT DOCUMENTS

| | | | |
|---|---|---|---|
| 2013/0079116 A1 | 3/2013 | Nelson et al. |
| 2013/0225268 A1 | 8/2013 | Caputo et al. |

FOREIGN PATENT DOCUMENTS

| | | |
|---|---|---|
| GB | 2098778 | 11/1982 |
| GB | 2105891 | 3/1983 |
| GB | 2161008 | 1/1986 |
| WO | WO96/09102 | 3/1996 |
| WO | WO99/10849 | 3/1999 |
| WO | WO00/12186 | 3/2000 |
| WO | WO00/32286 | 6/2000 |
| WO | WO01/82245 | 1/2001 |
| WO | WO02/099760 | 12/2002 |
| WO | WO2005/079242 | 9/2005 |

OTHER PUBLICATIONS

Jazzy Jackpots Article published by Strictly Slots in Mar. 2001.
Aristocrat Technologies Wonder 4 Game Feature published by Innovate Gaming in 2014.

* cited by examiner

GAMING SYSTEM AND METHOD FOR TRIGGERING A SECONDARY GAME IN ASSOCIATION WITH MULTIPLE CONCURRENTLY PLAYED PRIMARY GAMES

PRIORITY CLAIM

This application is a continuation of, claims priority to and the benefit of U.S. patent application Ser. No. 14/025,501, filed on Sep. 12, 2013, the entire contents of which is incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate a primary or base game. Certain known gaming machines enable a player to wager on and play a plurality of primary or base games simultaneously or concurrently. In many of these gaming machines, the award for each played primary game is based on the player obtaining a winning symbol or symbol combination and on the amount of the wager placed on that primary game (e.g., the higher the wager, the higher the award). Generally, symbols or symbol combinations which are less likely to occur usually provide higher awards.

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

There is a continuing need to provide new and different gaming systems and methods which incorporate new and different ways to play multiple games.

SUMMARY

The present disclosure relates generally to gaming systems and methods for enabling a player to select a plurality of games to simultaneously, concurrently or overlappingly play, wherein regardless or independent of which primary games the player selected to play, the secondary games available to be triggered remain the same.

In various embodiments, the gaming system disclosed herein includes a plurality of different available primary games wherein each primary game is associated with one or more secondary games. In these embodiments, the gaming system enables a player to select one or more of the plurality of available primary games to simultaneously, concurrently or overlappingly play. That is, the gaming system enables a player to select one of a plurality of different configurations of one or more primary games to wager on and simultaneously, concurrently or overlappingly play. In these embodiments, regardless of the configuration of primary games the player selected to wager on and simultaneously, concurrently or overlappingly play, any secondary game associated with any of the available primary games is available to be triggered. Accordingly, independent of the player's selection to play one primary game over another primary game, upon an occurrence of a designated secondary game triggering event, the gaming system selects a secondary game to play from the secondary games associated with each available primary game (i.e., the secondary game(s) associated with the player's selected primary game and the secondary game(s) associated with the non-player selected primary game). Such a configuration increases the level of excitement and enjoyment for certain players because such player's enjoy knowing that regardless of which primary game they select to play, the secondary game associated with any available primary game may be triggered and thus the player may experience the play of different secondary games.

More specifically, in certain embodiments, the gaming system displays to a player a plurality of different primary games available to be wagered on, such as by displaying a menu of available primary games to the player. These different primary games are associated with different primary game features or attributes. These different primary games are also associated with different secondary games or different bonus features. For example: (i) a first available primary game utilizes a first paytable and is associated with a free spin secondary game, (ii) a second available primary game utilizes a second, different paytable and is associated with an offer and acceptance secondary game, and (iii) a third available primary game utilizes a third, different paytable and is associated with a selection secondary game.

After displaying the different available primary games, the gaming system enables the player to select which of the different primary games to wager on to simultaneous or overlappingly play. In one embodiment, the gaming system enables the player to select the same primary game a plurality of times to wager on and simultaneous or overlappingly play. In another embodiment, the gaming system enables the player to select a quantity of primary games different than the quantity of primary games displayed to the player. Continuing with the above example, if the gaming system displays the three available primary games, the gaming system enables the player to select two primary games to simultaneous or overlappingly play, wherein the two selected primary games may include two plays of the same primary game or any combination of any two of the three available primary games. That is, in this example, the gaming system enables the player to select: (i) two simultaneous or overlappingly plays of the first available primary game, the second available primary game or the third available primary game, or (ii) two simultaneous or overlappingly plays selected from any combination of one play of the first available primary game, one play of the second available primary game and one play of the third available primary game.

Following the player's selection, the gaming system enables the player to wager on each of the selected primary games. For each of the simultaneous or overlapping primary game plays, the gaming system determines a primary game outcome, displays the determined primary game outcome, and provides the player any primary game awards associated with the determined primary game outcome.

In addition to determining a primary game outcome and providing any associated primary game awards for each simultaneous or overlapping primary game play, the gaming system determines whether a designated secondary game triggering event occurs in association with any of the simultaneous or overlapping primary game plays. In certain embodiments, a designated secondary game triggering event occurs in association with a play of a primary game independent of any displayed event associated with any plays of any of the primary games. In certain other embodiments, a designated secondary game triggering event occurs in association with a play of a primary game based on a displayed event associated with the play of the primary game.

If the gaming system determines that a designated secondary game triggering event occurred in association with at least one of the simultaneous or overlapping primary game plays, for each such primary game play, the gaming system selects at least one of a plurality of secondary games to play, wherein the plurality of secondary games include each of the secondary games associated with each of the plurality of available primary games the player originally selected from. That is, if a designated secondary game triggering event occurs in association with a primary game play, each of the secondary games associated with each of the plurality of primary games (regardless of if the player is playing that primary game or not) are available to be selected and subsequently played. Put differently, if a designated secondary game triggering event occurs in association with one primary game play, the gaming system determines a secondary game to play wherein the determined secondary game may be: (i) the secondary game associated with that primary game play, (ii) a secondary game associated with another of the simultaneous or overlapping primary game plays, and/or (iii) a secondary game associated with a previously available, but non-selected (and thus non-played) primary game.

It should be appreciated that the selection of a secondary game in response to an occurrence of a designated secondary game triggering event occurs in addition or in alternative to the triggering of any secondary games associated with any of the played primary games. That is, in addition or alternative to a play of a primary game causing a triggering of a secondary game associated with that primary game, the occurrence of a designated secondary game triggering event causes a triggering of a secondary game wherein the triggered secondary game may be the secondary game associated with that primary game or another secondary game associated with another available primary game. Put differently, the gaming system employs direct triggers of secondary games (i.e., a secondary game associated with a primary game may be directly triggered based on an occurrence of a triggering event associated with that primary game) and indirect triggers of secondary games (i.e., a secondary game not associated with a primary game may be indirectly triggered (via a secondary game selection sequence) based on an occurrence of a designated triggering event).

Continuing with the above example, if the player selected to simultaneous or overlappingly play the first primary game and the second primary game and a designated secondary game triggering event occurred in association with the second primary game, the gaming system selects a secondary game to play from the plurality of secondary games including the free spin secondary game associated with the first available primary game (i.e., a played primary game not associated with the occurrence of the secondary game triggering event), the offer and acceptance secondary game associated with the second available primary game (i.e., a played primary game associated with the occurrence of the secondary game triggering event) and the selection secondary game associated with the third available primary game (i.e., a non-played primary game not associated with the occurrence of the secondary game triggering event).

After selecting one or more secondary games to play, for each secondary game selected to play, the gaming system determines a secondary game outcome, displays the determined secondary game outcome, and provides the player any secondary game award associated with the determined secondary game outcome.

Accordingly, the gaming system disclosed herein provides a player the opportunity to play one or more secondary games associated with one or more primary games even if the player is not currently playing such primary games. Such a configuration of providing one or more secondary games regardless of the configuration of primary games selected to simultaneous or overlappingly play provides an increased level of excitement and enjoyment for certain players and exposes such players to one or more secondary games these players may not otherwise play.

Additional features and advantages are described herein, and will be apparent from the following Detailed Description and the figures.

DETAILED DESCRIPTION

Overlapping Primary Game Plays with Different Available Secondary Games

In various embodiments, the gaming system disclosed herein includes a plurality of different available primary games wherein each primary game is associated with one or more secondary games. In these embodiments, the gaming system enables a player to select one or more of the plurality of available primary games to simultaneously, concurrently or overlappingly play. That is, the gaming system enables a player to select one of a plurality of different configurations of one or more primary games to wager on and simultaneously, concurrently or overlappingly play. In these embodiments, regardless of the configuration of primary games the player selected to wager on and simultaneously, concurrently or overlappingly play, any secondary game associated with any of the available primary games is available to be triggered. Accordingly, independent of the player's selection to play one primary game over another primary game, upon an occurrence of a designated secondary game triggering event, the gaming system selects a secondary game to play from the secondary games associated with each available primary game (i.e., the secondary game(s) associated with the player's selected primary game and the secondary game(s) associated with the non-player selected primary game). Such a configuration increases the level of excitement and enjoyment for certain players because such player's enjoy knowing that regardless of which primary game they select to play, the secondary game associated with any available primary game may be triggered and thus the player may experience the play of different secondary games.

While certain of the embodiments described below are directed to playing the simultaneous, concurrent or overlapping games as simultaneous, concurrent or overlapping primary or base games, it should be appreciated that the present disclosure may additionally or alternatively be employed with a plurality of simultaneous, concurrent or overlapping secondary or bonus games with the triggering of one or more bonus features or additional games. Moreover, while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

Figure 1:
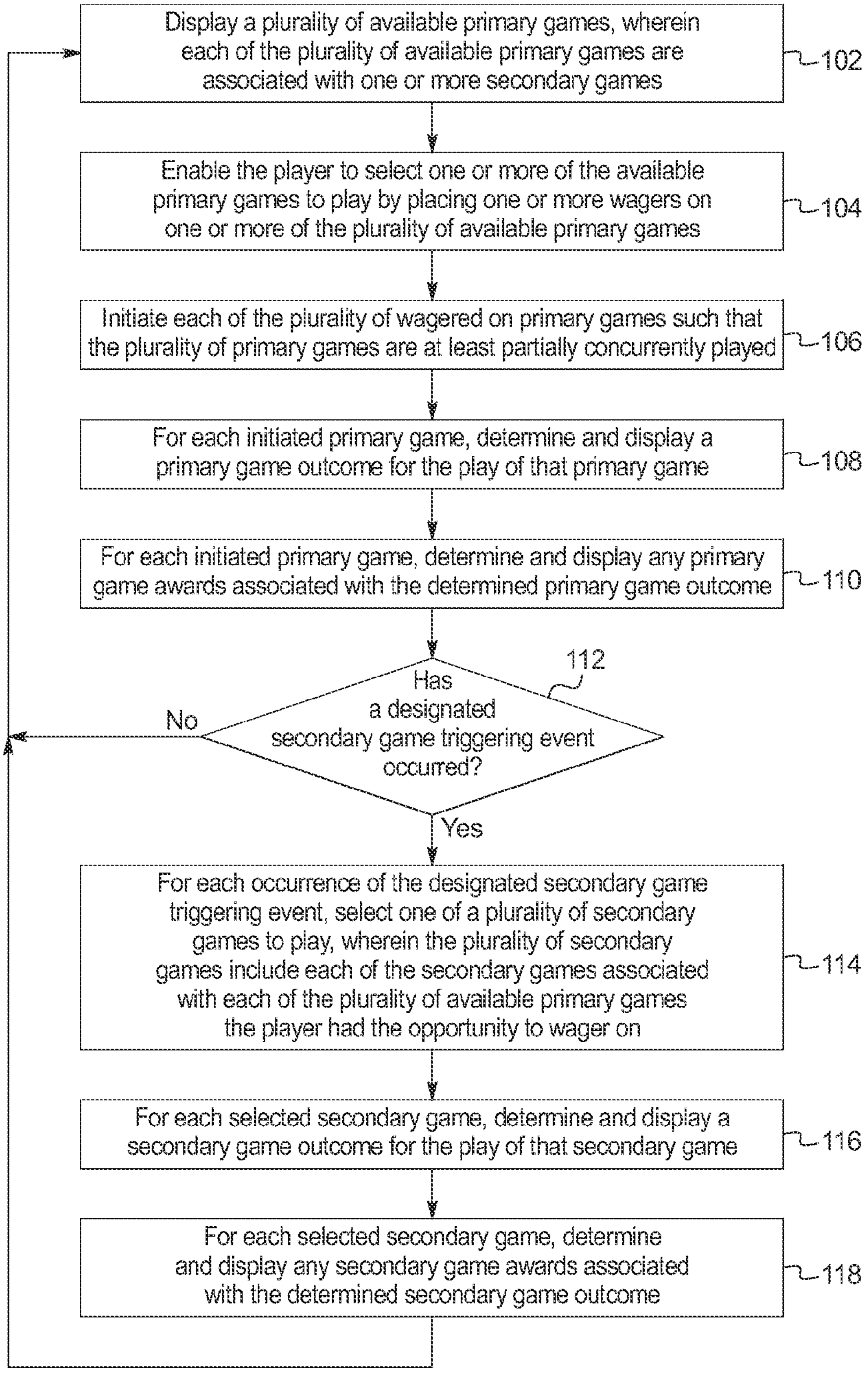
FIG. 1 is a flow chart an example process for operating a gaming system including a plurality of simultaneous or overlapping primary game plays with any associated secondary game being available to be triggered in association with any of the available primary game plays as disclosed herein.

Referring now to FIG. 1, a flowchart of an example embodiment of a process for operating a gaming system disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In various embodiments, the gaming system displays a plurality of available primary games as indicated in block 102. In certain embodiments, two or more of these plurality of available primary games are different primary games. In certain embodiments, each of the plurality of available primary games are different primary games. In these embodiments, at least two or more of the available primary games are different game types, have different game themes, and/or different game styles. In other embodiments, at least two or more of the plurality of primary games utilize different sets of available symbols. In another embodiment, at least two or more of the different primary games utilize different paytables. In another embodiment, at least two or more of the different primary games are associated with different average expected payback percentages. In another embodiment, at least two or more of the different primary games employ different features or attributes or otherwise have different characteristics.

Figure 2A:
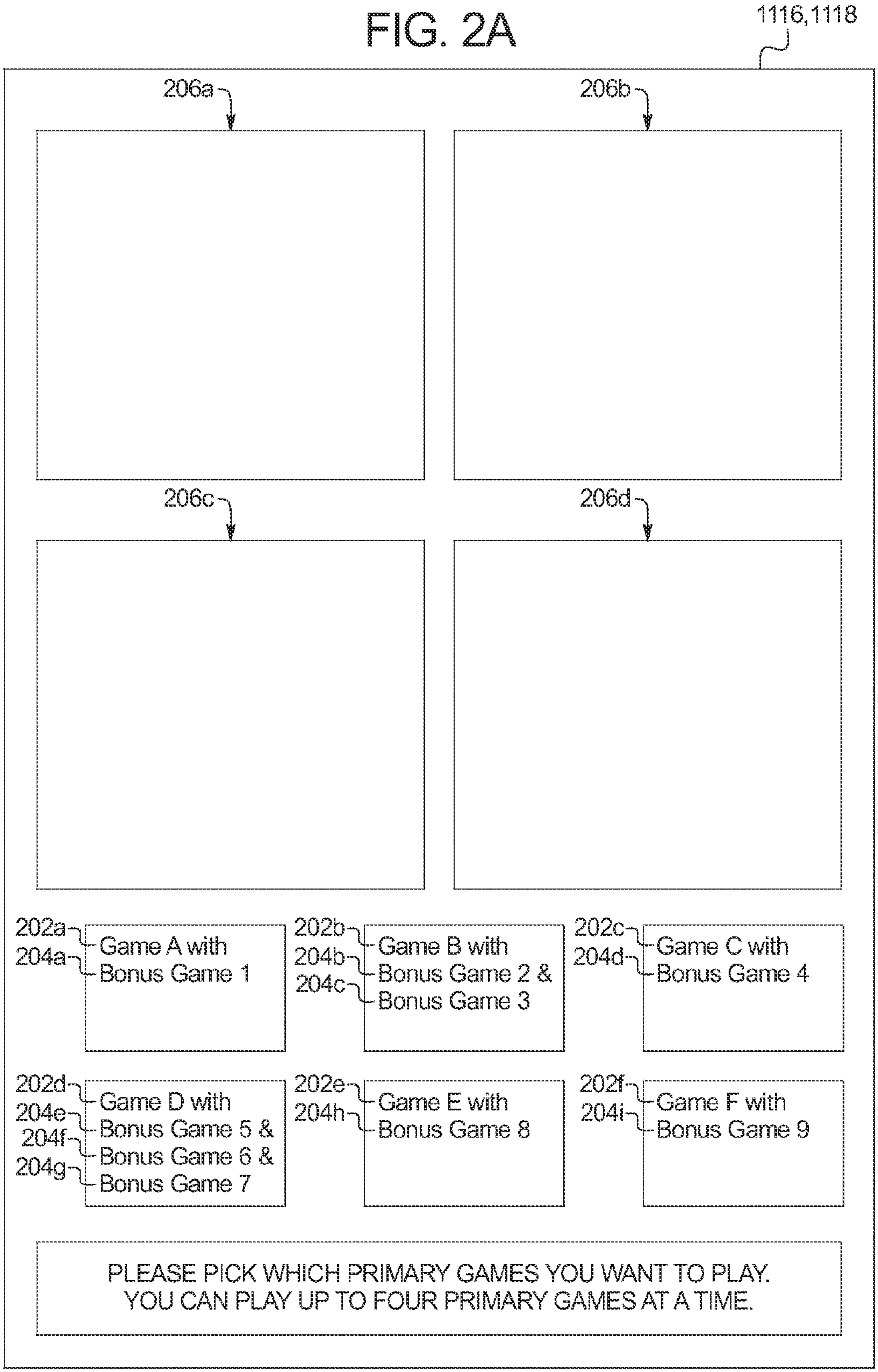
FIGS. 2A, 2B, 2C, 2D, 2E and 2F are front views of one embodiment of the gaming system disclosed herein illustrating a play of a plurality of simultaneous or overlappingly game plays and a triggering of any available secondary game.

For example, as seen in FIG. 2A, the gaming system displays a plurality of primary games to the player. Specifically, the gaming system display a menu of available games including a first available primary game 202*a* (illustrated as "GAME A"), a second available primary game 202*b* (illustrated as "GAME B"), a third available primary game 202*c* (illustrated as "GAME C"), a fourth available primary game 202*d* (illustrated as "GAME D"), a fifth available primary game 202*e* (illustrated as "GAME E"), and a sixth available primary game 202*f* (illustrated as "GAME F"). In this example, each of these six primary games are different primary games. In this example, the gaming system provides appropriate messages such as "PLEASE PICK WHICH PRIMARY GAMES YOU WANT TO PLAY" to the player visually, or through suitable audio or audiovisual displays.

As further indicated in block 102 of FIG. 1, each of the plurality of available primary games are associated with one or more secondary games. In certain embodiments, one or more of these secondary games are different secondary games. In certain embodiments, each of these secondary games are different secondary games. In one embodiment, two or more of the different secondary games are different types of secondary games, such a selection game and a free spin game. In another embodiment, two or more of the different secondary games are associated with different average expected payback payouts. In another embodiment, two or more of the different secondary game employ different features or attributes.

For example, the first available primary game 202*a* is associated with a first secondary game 204*a* (illustrated as "BONUS GAME 1"), the second available primary game 202*b* is associated with a second secondary game 204*b* (illustrated as "BONUS GAME 2") and a third secondary game 204*c* (illustrated as "BONUS GAME 3"), the third available primary game 202*c* is associated with a fourth secondary game 204*d* (illustrated as "BONUS GAME 4"), the fourth available primary game 202*d* is associated with a fifth secondary game 204*e* (illustrated as "BONUS GAME 5"), a sixth secondary game 204*f* (illustrated as "BONUS GAME 6") and a seventh secondary game 204*g* (illustrated as "BONUS GAME 7"), the fifth available primary game 202*e* is associated with a eighth secondary game 204*h* (illustrated as "BONUS GAME 8"), and the sixth available primary game 202*f* is associated with a ninth secondary game 204*i* (illustrated as "BONUS GAME 9").

As indicated in block 104, the gaming system enables the player to select one or more of the available primary games to play by placing one or more wagers on one or more of the plurality of available primary games.

In one embodiment, the gaming system enables a player to wager on up to a first quantity of the available primary games, wherein the first quantity is less than a quantity of the available primary games. For example, as seen in FIG. 2A, the gaming system enables the player to wager on up to four primary games of the six primary games available. In this example, the gaming system provides appropriate messages such as "YOU CAN PLAY UP TO FOUR PRIMARY GAMES AT A TIME" to the player visually, or through suitable audio or audiovisual displays. In another embodiment, the gaming system enables a player to wager on up to a first quantity of the available primary games, wherein the first quantity is equal to a quantity of the available primary games. In another embodiment, the gaming system enables a player to wager on up to a first quantity of the available primary games, wherein the first quantity is greater than a quantity of the available primary games.

Figure 2B:
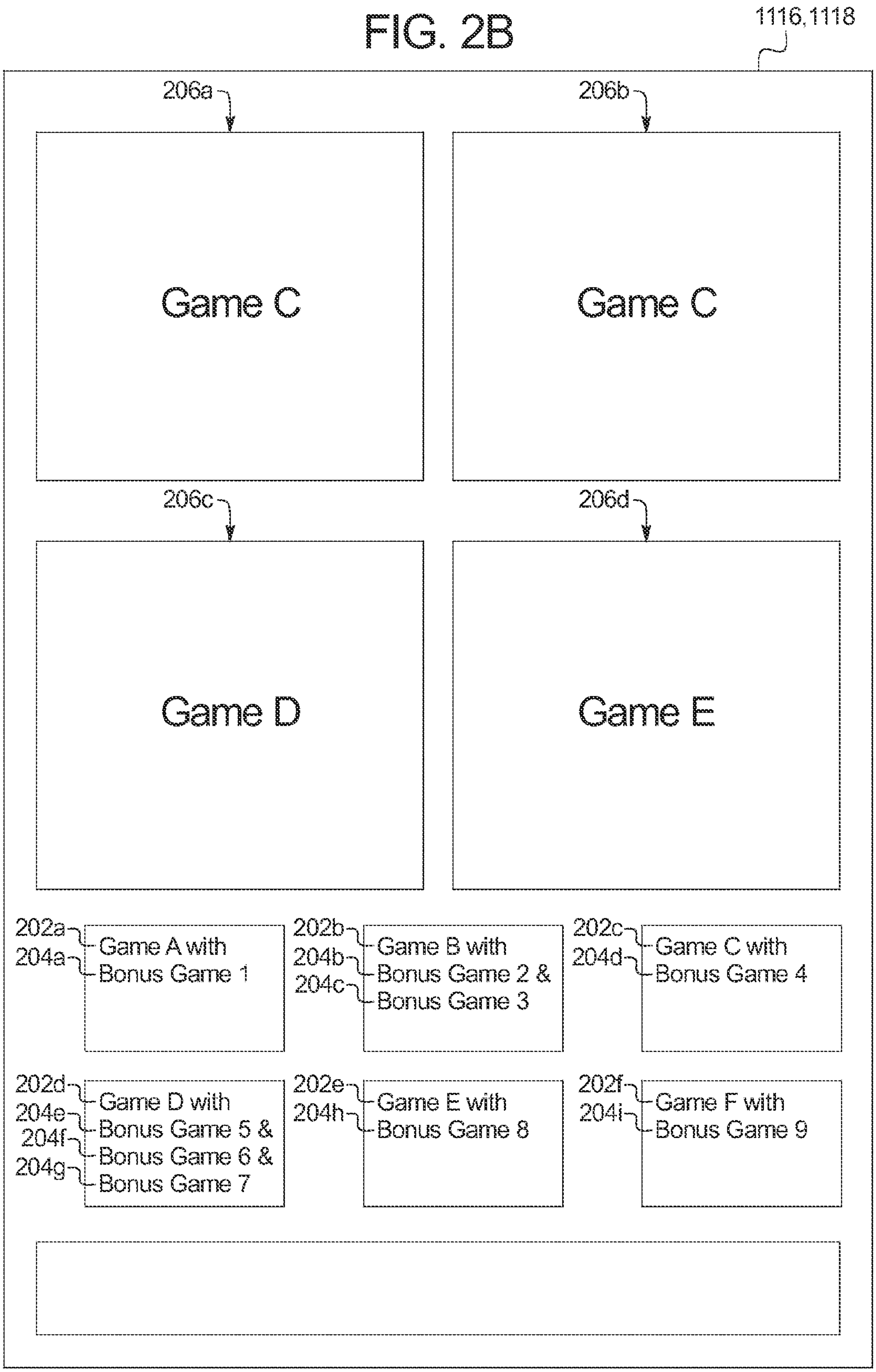

In one embodiment, the gaming system enables the player to wager on the same primary game a plurality of times. That is, in this embodiment, the gaming system enables the player to separately and distinctly play the same game a plurality of times. For example, as seen in FIG. 2B, the player selected to play and wagered on two plays of the third primary game 202*c* (as seen in gaming fields 206*a* and 206*b*), one play of the fourth primary game 202*d* (as seen in gaming field 206*c*) and one play of the fifth primary game 202*e* (as seen in gaming field 206*d*). In another embodiment, the gaming system enables the player to wager on the same primary game one time.

In one embodiment, the gaming system enables the player to place the same wager amount on each of the selected primary games. In another embodiment, the gaming system enables the player to wager different wager amounts on two or more of the selected primary games. It should be appreciated that by enabling the player to select which primary games to play (via placing one or more wagers) and select which primary games not to play (via not placing any wagers), the gaming system enables the player to customize the primary game configuration associated with a plurality of simultaneous, concurrent or overlapping played primary games.

After wagering on a plurality of primary games, the gaming system initiates each of the plurality of wagered on primary games such that the plurality of primary games are at least partially concurrently played as indicated in block 106.

In one embodiment, the gaming system initiates and displays each of the plurality of games simultaneously, substantially simultaneously or overlappingly. In another embodiment, the gaming system initiates two or more of the plurality of games simultaneously or substantially simultaneously and initiates (but does not complete) two of more of the plurality of games sequentially or substantially sequentially. In another embodiment, the gaming system initiates (but does not complete) each of the plurality of games sequentially.

For each initiated primary game, the gaming system determines and displays a primary game outcome for the play of that primary game as indicated in block 108. It should be appreciated that the gaming system independently determines the individual primary game outcome for each of the individually played primary games. For each initiated primary game, the gaming system also determines and displays any primary game awards associated with the determined primary game outcome as indicted in block 110.

Figure 2C:
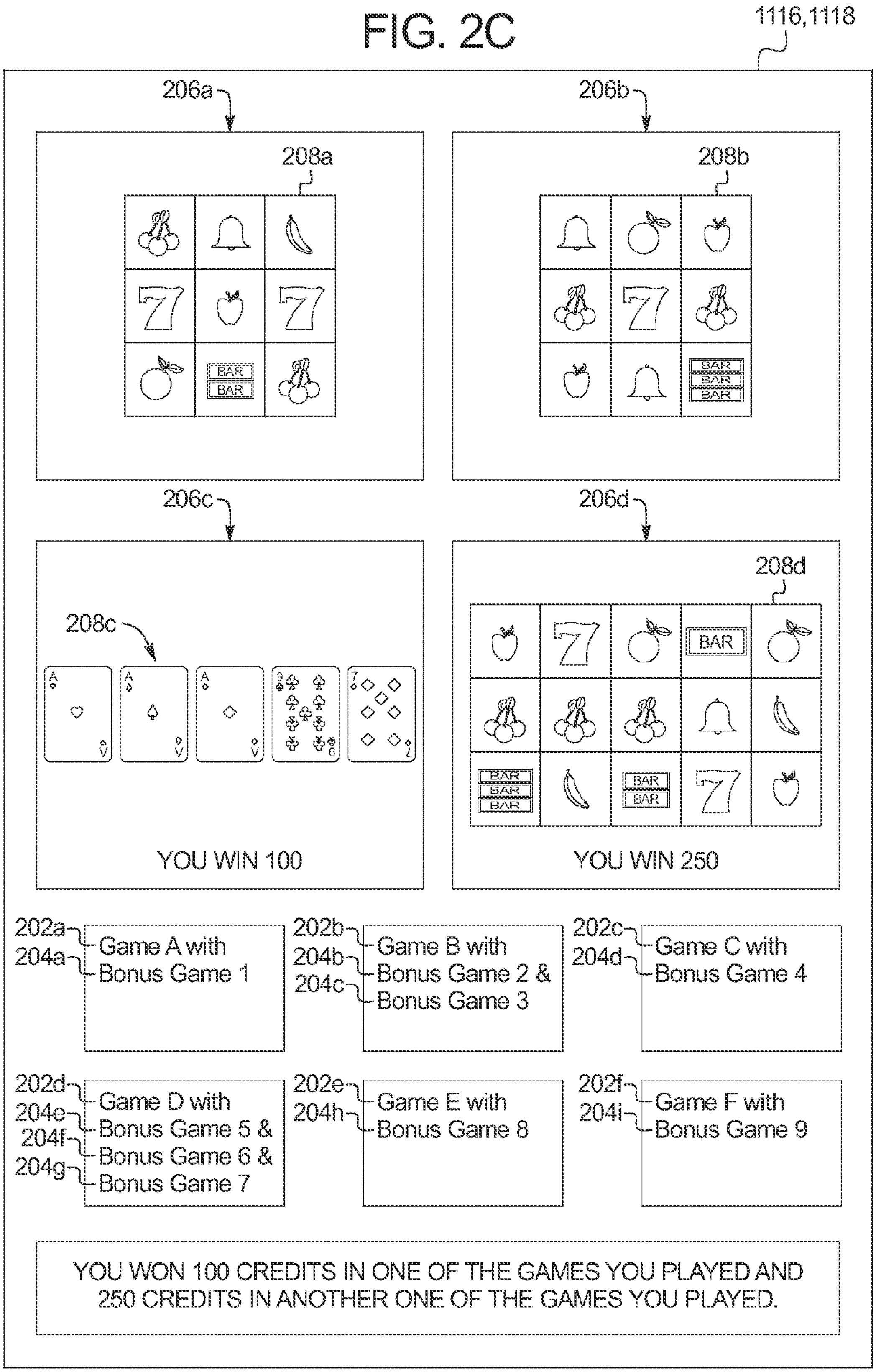

For example, as seen in FIG. 2C, the gaming system generated a first losing primary game outcome 208*a* (illustrated as a losing symbol combination) for the first of the two plays of the third primary game 202*c*, a second losing primary game outcome 208*b* (illustrated as a losing symbol combination) for the second of the two plays of the third primary game 202*c*, a winning primary game outcome 208*c* (illustrated as a winning poker card hand) associated with an award of one-hundred credits for the play of the fourth primary game 202*d* and a winning primary game outcome 208*d* (illustrated as a wining symbol combination) associated with an award of two-hundred-fifty credits for the play of the fifth primary game 202*e*. In this example, the gaming system provides appropriate messages such as "YOU WON 100 CREDITS IN ONE OF THE GAMES YOU PLAYED AND 250 CREDITS IN ANOTHER ONE OF THE GAMES YOU PLAYED" to the player visually, or through suitable audio or audiovisual displays.

In addition to the play of each of the simultaneous, concurrent or overlapping primary game plays, the gaming system determines if a designated secondary game triggering event occurs in association with any of the simultaneous, concurrent or overlapping primary game plays as indicated in block 112 of FIG. 1.

In one embodiment, a designated secondary game triggering event occurs based on a displayed event in a play of one or more displayed primary games. In another embodiment, the gaming system tracks the occurrences of one or more suitable events occurring at or in association with one or more players and/or one or more games and determines, based on these tracked events, whether a designated secondary game triggering event occurs. In another embodiment, the gaming system defines one or more game play parameters, wherein each time a player's tracked game play activity satisfies the defined parameter, a designated secondary game triggering event occurs. In another embodiment, a designated secondary game triggering event occurs independent of any displayed event in any play of any game. In certain embodiments, at least one of the primary games is associated with a designated secondary game triggering event that is different than the designated secondary game triggering event associated with one or more of the other primary games.

If the gaming system determines that no designated secondary game triggering event occurred, the gaming system returns to block 102 and displays the plurality of available primary games (in anticipation of the player placing one or more subsequent wagers).

On the other hand, if the gaming system determines that a designated secondary game triggering event occurred, as indicated in block 114, for each occurrence of the designated secondary game triggering event, the gaming system selects one of a plurality of secondary games to play, wherein the plurality of secondary games include each of the secondary games associated with each of the plurality of available primary games the player had the opportunity to wager on. That is, if a designated secondary game triggering event occurs in association with a primary game play, each of the secondary games associated with each of the plurality of primary games (regardless of if the player is playing that primary game or not) are available to be selected and subsequently played. Put differently, if a designated secondary game triggering event occurs in association with one primary game play, the gaming system determines a secondary game to play wherein the determined secondary game may be selected from a pool of secondary games including: (i) the secondary game associated with that primary game play, (ii) a secondary game associated with another of the simultaneous or overlapping primary game plays, and/or (iii) a secondary game associated with a previously available, but non-selected (and thus non-played) primary game.

Figure 2D:
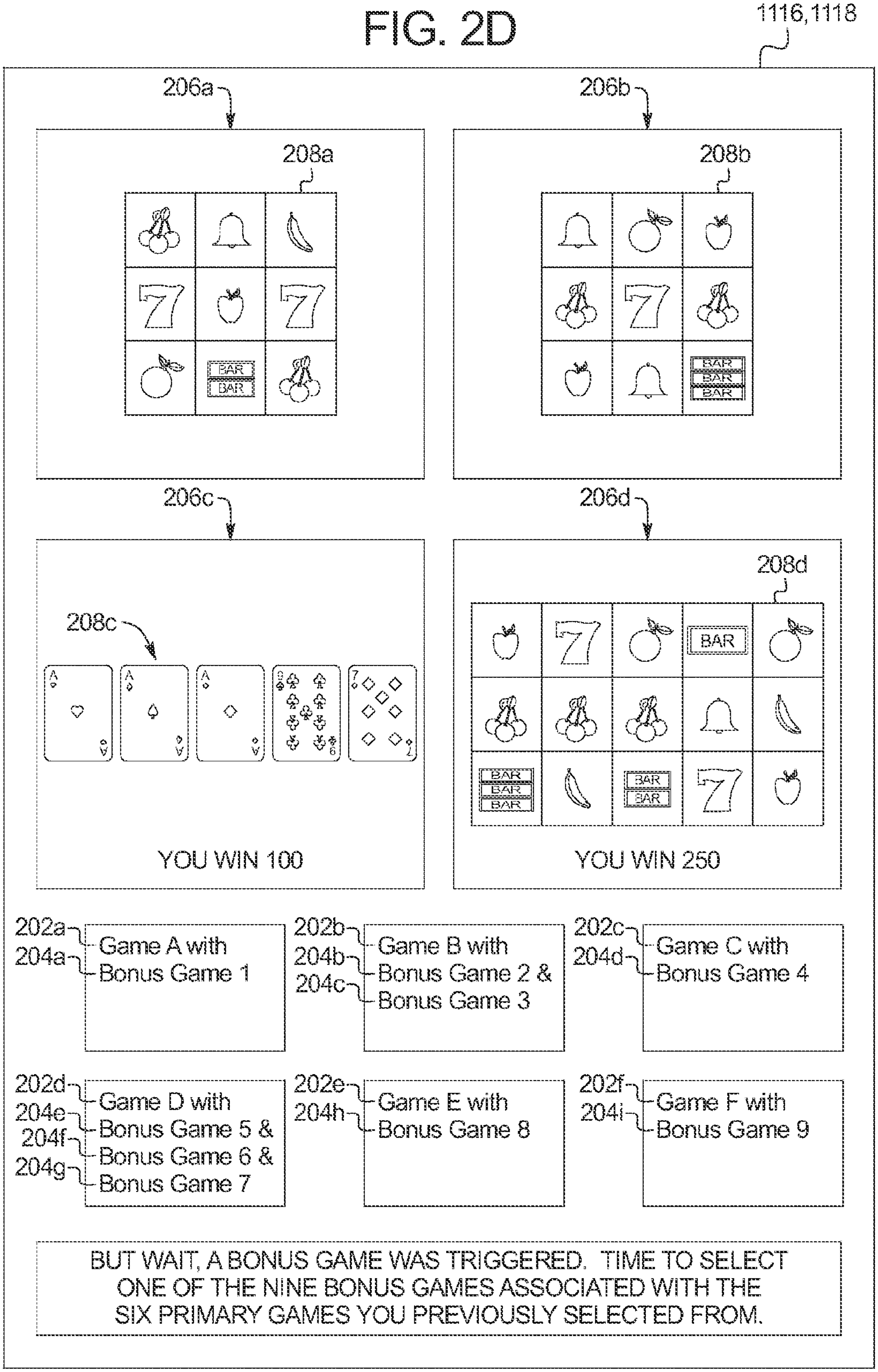

Continuing with the example above, as seen in FIG. 2D, the gaming system determines that a designated secondary game triggering event occurs in association with the simultaneous, concurrent or overlapping played fifth primary game 202*e*. In this example, for the occurrence of the designated secondary game triggering event, the gaming system selects a secondary game to play from the nine secondary games 204*a* to 204*i* associated with the six primary games 202*a* to 202*f*. That is, even though the designated secondary game triggering event occurred in association with the fifth primary game 202*e*, the gaming system selects a secondary game to play from: (i) the eighth secondary game 204*h* associated with the fifth primary game, (ii) the fourth secondary game 204*d*, the fifth secondary game 204*e*, the sixth secondary game 204*f* and the seventh secondary game 204*g* associated with the wagered on plays of the third primary game 202*c* and the fourth primary game 202*d*, and (iii) the first secondary game 204*a*, the second secondary game 204*b* and the ninth secondary game 204*i* associated with the non-wagered on and non-played first available primary game 202*a*, second available primary game 202*b*, and sixth available primary game 202*f*, respectively. In this example, the gaming system provides appropriate messages such as "BUT WAIT, A BONUS GAME WAS TRIGGERED. TIME TO SELECT ONE OF THE NINE BONUS GAMES ASSOCIATED WITH THE SIX PRIMARY GAMES YOU PREVIOUSLY SELECTED FROM" to the player visually, or through suitable audio or audiovisual displays.

Figure 2E:
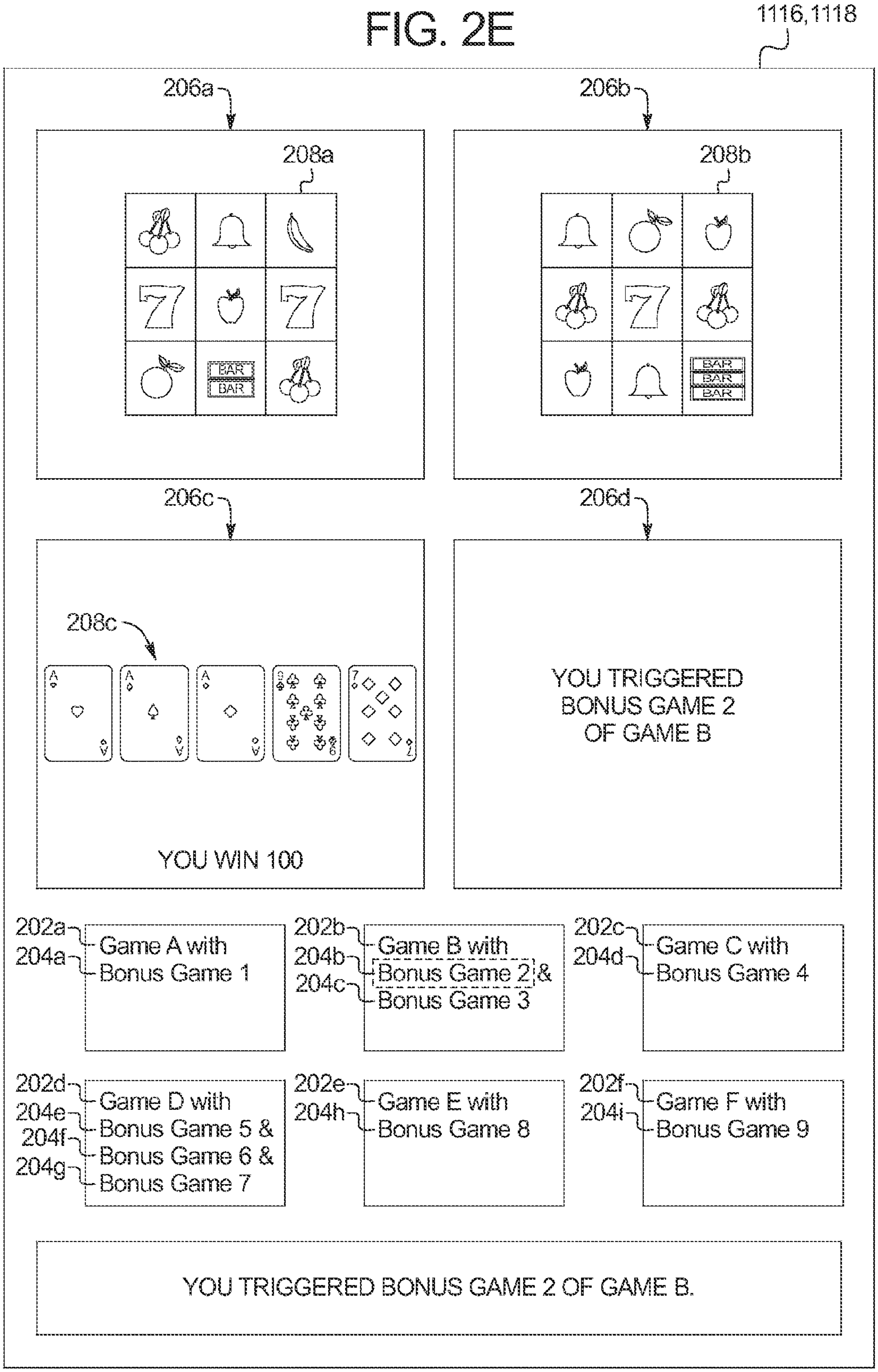

As seen in FIG. 2E, the gaming system selects the second secondary game 204*b* to play. As seen in this example, despite the player not wagering on and not playing the second primary game 202*b*, the gaming system still selected the second secondary game 204*b* associated with the second primary game 202*b*. In this example, the gaming system provides appropriate messages such as "YOU TRIGGERED BONUS GAME 2 OF GAME B" to the player visually, or through suitable audio or audiovisual displays.

In one embodiment, each of the secondary games have the same probability of being selected. In another embodiment, at least two of the secondary games have different probabilities of being selected. In another embodiment, each of the secondary games have a different probability of being selected. In certain embodiments, the probability of one or more secondary games being selected is based, at least in part, on which primary games the player selected to wager on. In certain embodiments, the probability of one or more secondary games being selected is based, at least in part, on which primary game is associated with the occurrence of the designated secondary game triggering event. In another embodiment, each of the secondary games have a greater than zero probability of being selected. In another embodiment, zero, one or more of the secondary games have a zero probability of being selected. In one such embodiment, the gaming system selects a secondary game from the secondary games associated with the wagered on primary games, wherein any secondary game associated with any non-wagered on primary game is associated with a zero probability of being selected.

In one embodiment, the gaming system employs a weighted table to select which secondary game to trigger. In another embodiment, the gaming system employs one or more secondary game selection sequences to select which secondary game to trigger. In one such embodiment, a secondary game selection sequence includes a secondary game selection generator, such as a wheel with each of the different available secondary games indicated in a different section of the wheel. In this embodiment, the secondary game selection generator spins and the secondary game(s) indicated by one or more stopped indicators determines which secondary games to trigger. In another such embodiment, a secondary game selection sequence includes a plurality of selections wherein each of the selections is associated with one of the different available secondary games. In this embodiment, the gaming system enables the player to pick one or more selections wherein the gaming system triggers the secondary games associated with the player's picked selections. In certain embodiments, the secondary game triggered as a result of one or more of these secondary game selection sequences are based on a weighted probability table. It should be appreciated that any suitable secondary game selection sequence, such as any suitable primary game or secondary game described herein, may be employed in association with determining which secondary games to trigger.

It should be further appreciated that the selection of a secondary game in response to an occurrence of a designated secondary game triggering event occurs in addition or in alternative to the triggering of any secondary games associated with any of the played primary games. That is, in addition or alternative to a play of a primary game causing a triggering of a secondary game associated with that primary game, the occurrence of a designated secondary game triggering event causes a triggering of a secondary game wherein the triggered secondary game may be the secondary game associated with that primary game or another secondary game associated with another available primary game. Put differently, the gaming system employs direct triggers of secondary games (i.e., a secondary game associated with a primary game may be directly triggered based on an occurrence of a triggering event associated with that primary game) and indirect triggers of secondary games (i.e., a secondary game not associated with a primary game may be indirectly triggered (via a secondary game selection sequence) based on an occurrence of a designated triggering event). For example, if a first played primary game (i.e. a first wagered on primary game) is associated with a first secondary game, a second, non-played primary game (i.e. a second, non-wagered on primary game) is associated with a second, different secondary game and a first secondary game triggering event occurs, the gaming system directly triggers the first secondary game (and does not trigger the second secondary game not directly associated with the first primary game). On the other hand, if a designated secondary game triggering event occurs, the gaming system indirectly triggers either the first secondary game or the second, different secondary game, wherein the selection of which secondary game is indirectly triggered occurs via one or more secondary game selection sequences.

Returning to FIG. 1, after selecting one of the plurality of secondary games to play for each occurrence of the designated secondary game triggering event, for each selected secondary game, the gaming system determines and displays a secondary game outcome for the play of that secondary game as indicated in block 116. It should be appreciated that the gaming system independently determines the individual secondary game outcome for each of the individually played secondary games. For each selected secondary game, the gaming system also determines and displays any secondary game awards associated with the determined secondary game outcome as indicted in block 118.

Figure 2F:
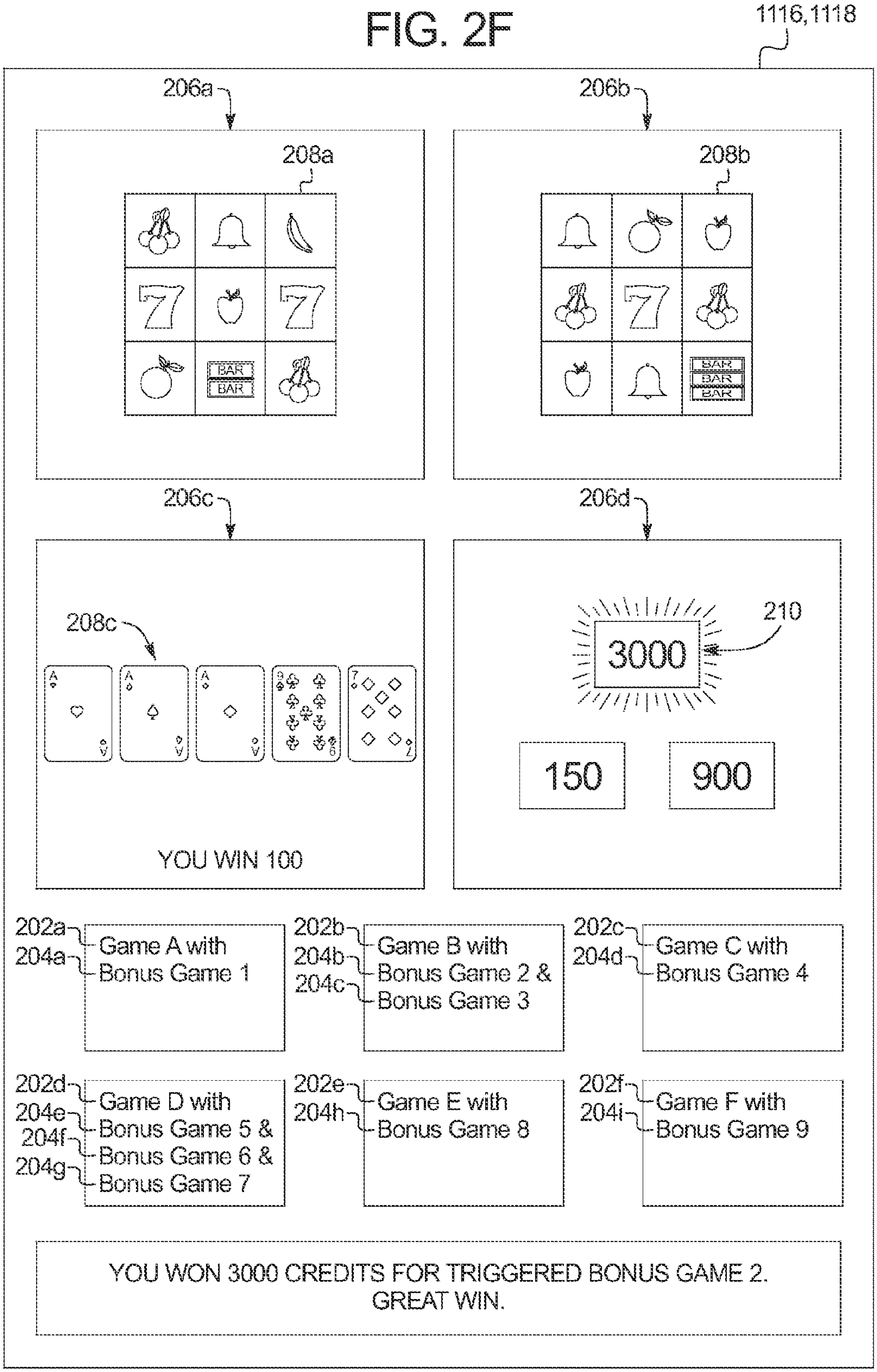

For example, as seen in FIG. 2F, for the triggered second secondary game 204*b*, the gaming system determined a winning secondary game outcome (illustrated as a picked selection) associated with an award of three-thousand credits. In this example, the gaming system provides appropriate messages such as "YOU WON 3000 CREDITS FOR TRIGGERED BONUS GAME 2" and "GREAT WIN" to the player visually, or through suitable audio or audiovisual displays.

Following determining and displaying any secondary game awards associated with the determined secondary game outcome(s), the gaming system returns to block 102 and displays the plurality of available primary games (in anticipation of the player placing one or more subsequent wagers).

In one embodiment, rather than simultaneously, concurrently or overlappingly playing a plurality of primary games, the gaming system enables a player to play one primary game at a time. In this embodiment, the gaming system includes a plurality of primary games (wherein each primary game is associated with one or more secondary games) and enables the player to pick which of the plurality of primary games to play. If a designated secondary game triggering event occurs, the gaming system selects a secondary game to play from the plurality of secondary games associated with the plurality of primary games of the gaming system. That is, in this embodiment, while a player plays one primary game at a time, the gaming system avails the player of the plurality of secondary games associated with each of the primary games, regardless of which primary game the player selected to play.

As mentioned above, any suitable game, type of game or quantity of games may be implemented as one or more of the simultaneously, concurrently or overlappingly played primary games disclosed herein. In different embodiments, one or more of the simultaneously, concurrently or overlappingly played primary games include, but are not limited to: any suitable slot game, any suitable wheel game, any suitable card game, any suitable keno game, any suitable bingo game, any suitable die or dice game, any suitable virtual horse racing game; any suitable offer and acceptance game, any suitable award ladder game, any suitable puzzle-type game, any suitable persistence game, any suitable selection game, any suitable cascading symbols game, any suitable ways to win game, any suitable scatter pay game, any suitable elimination game, any suitable group or community cooperation game, any suitable group or community competition game, or any other suitable type of game disclosed herein. It should be appreciated that regardless of which primary games or types of games are played, as described above, each displayed primary game includes a displayed determination or generation of a primary game outcome for that primary game and the displaying of any award associated with the determined or generated primary game outcome for that primary game.

In different embodiments, one or more secondary games associated with one or more available primary games include, but are not limited to:

i. a play of any suitable slot game;
ii. a play of any suitable free spins or free game activations;
iii. a play of any suitable wheel game;
iv. a play of any suitable card game;
V. a play of any suitable offer and acceptance game;
vi. a play of any suitable award ladder game;
vii. a play of any suitable puzzle-type game;
viii. a play of any suitable persistence game;
ix. a play of any suitable selection game;
x. a play of any suitable cascading symbols game;
xi. a play of any suitable ways to win game;
xii. a play of any suitable scatter pay game;
xiii. a play of any suitable coin-pusher game;
xiv. a play of any suitable elimination game;
xv. a play of any suitable stacked wilds game;
xvi. a play of any suitable trail game;
xvii. a play of any suitable bingo game;
xviii. a play of any suitable video scratch-off game;
xix. a play of any suitable pick-until-complete game;
xx. a play of any suitable shooting simulation game;
xxi. a play of any suitable racing game;
xxii. a play of any suitable promotional game;
xxiii. a play of any suitable high-low game;
xxiv. a play of any suitable lottery game;
xxv. a play of any suitable number selection game;
xxvi. a play of any suitable dice game;
xxvii. a play of any suitable skill game;
xxviii. a play of any suitable auction game;
xxix. a play of any suitable reverse-auction game;
xxx. a play of any suitable group game;
xxxi. a play of any suitable game in a service window;
xxxii. a play of any suitable game on a mobile device; and/or
xxxiii. a play of any suitable game disclosed herein;

In another embodiment, a secondary game includes the activation, modification or reconfiguration of one or more features associated with one or more plays of one or more primary games and/or one or more plays of any suitable secondary game. In different such embodiments, these activations, modifications and reconfigurations include, but are not limited to:

i. a book-end wild symbols feature;
ii. a stacked wild symbols feature;
iii. an expanding wild symbols feature;
iv. a wild reel feature;
v. a retrigger symbol feature;
vi. an anti-terminator symbol feature;
vii. a locking reel feature,
viii. a locking symbol position feature;
ix. a modification of an amount of credits of a credit balance;
x. a modification of an amount of promotional credits;
xi. a modification of a placed wager amount;
xii. a modification of a wager amount available to be placed;
xiii. a modification of a placed side wager amount;
xiv. a modification of a side wager amount available to be placed;
xv. a modification of a rate of earning player tracking points;
xvi. a modification of a number of wagered on paylines;
xvii. a modification of a number of paylines available to be wagered on;
xviii. a modification of a wager placed on one or more paylines (or on one or more designated paylines);
xix. a modification of a number of ways to win wagered on;
xx, a modification of a number of available ways to win to be wagered on;
xxi. a modification of a wager placed on one or more ways to win (or on one or more designated ways to win);
xxii. a modification of a paytable utilized for a play of a game;
xxiii. an application of a modifier, such as a multiplier or an additional quantity of credits, to one or more awards of a paytable utilized for a play of a game,
xxiv. a modification of an average expected payback percentage of a play of a game;
xxv. a modification of an average expected payout of a play of a game;
xxvi. a modification of one or more awards available;
xxvii. a modification of a range of awards available;
xxviii, a modification of a type of awards available;
xxix. a modification of one or more progressive awards;
xxx. a modification of which progressive awards are available to be won;
xxxi. a modification of one or more modifiers, such as multipliers, available;
xxxii. a modification of an activation of a reel (or a designated reel);
xxxiii. a modification of an activation of a plurality of reels;

xxxiv. a modification of a generated outcome (or a designated generated outcome);

xxxv. a modification of a generated outcome (or a designated generated outcome) associated with an award over a designated value;

xxxvi. a modification of a generated outcome (or a designated generated outcome) on a designated payline;

xxxvii. a modification of a generated outcome (or a designated generated outcome) in a scatter configuration;

xxxviii. a modification of a winning way to win (or a designated winning way to win);

xxxix. a modification of a designated symbol or symbol combination;

xl. a modification of a generation of a designated symbol or symbol combination on a designated payline;

xli. a modification of a generation of a designated symbol or symbol combination in a scatter configuration;

xlii. a modification of a triggering event of a play of a secondary or bonus game;

xliii. a modification of an activation of a secondary or bonus display (such as an award generator);

xliv. a modification of a quantity of activations of a secondary or bonus display (e.g., a modification of a quantity of spins of an award generator);

xlv. a modification of a quantity of sections of a secondary or bonus display (e.g., a modification of a quantity of sections of an award generator);

xlvi. a modification of one or more awards of a secondary or bonus display;

xlvii. a modification of an activation of a community award generator;

xlviii. a modification of a quantity of activations of a community award generator;

xlix. a modification of a quantity of sections of a community award generator;

l. a modification of one or more awards of a community award generator;

li. a modification of a generated outcome (or a designated generated outcome) in a secondary game;

lii. a modification of a quantity of picks in a selection game;

lv. a modification of a quantity of offers in an offer and acceptance game;

liv. a modification of a quantity of moves in a trail game;

lv. a modification of an amount of free spins provided;

lvi. a modification of a game terminating or ending condition;

lvii. a modification of how one or more aspects of one or more games (e.g., colors, speeds, sound) are displayed to a player;

lviii. a modification of access to different websites a player may access via a mobile device;

lix. a modification of audio-visual content a player may access via a mobile device;

lx. a modification of a player's avatar; and/or lxi. a modification of any game play feature associated with any play of any game disclosed herein;

In different embodiments, one or more awards provided in association with one or more primary game plays and/or one or more secondary game plays include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product such as a free teddy bear, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

In one embodiment, the gaming system causes at least one display device of at least one electronic gaming machine to display the plurality of primary games and/or any triggered secondary game. In another embodiment, in addition or in alternative to each electronic gaming machine displaying the plurality of primary games and/or any triggered secondary game, the gaming system causes one or more community or overhead display devices to display part or all of the plurality of primary games and/or any triggered secondary game to one or more other players or bystanders either at a gaming establishment or viewing over a network, such as the internet. In another embodiment, in addition or in alternative to each electronic gaming machine displaying the plurality of primary games and/or any triggered secondary game, the gaming system causes one or more internet sites to each display the plurality of primary games and/or any triggered secondary game such that a player is enabled to log on from a personal web browser. In another such embodiment, the gaming system enables the player to play one or more games on one device while viewing the plurality of primary games and/or any triggered secondary game from another device, such as a desktop or laptop computer.

In different embodiments, a secondary game triggering event (including a designated secondary game triggering event) occurs based on an outcome associated with one or more plays of any primary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes such conditions to be satisfied and/or one or more of such events to occur.

In different embodiments, the gaming system does not provide any apparent reasons to the players for an occurrence of a secondary game triggering event (including a designated secondary game triggering event). In these embodiments, such determinations are not triggered by an event in a primary game or based specifically on any of the plays of any primary games. That is, these events occur without any explanation or alternatively with simple explanations.

In one such embodiment, a secondary game triggering event (including a designated secondary game triggering event) occurs based on an amount of coin-in. In this embodiment, the gaming system determines if an amount of coin-in wagered reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a secondary game triggering event (including a designated secondary game triggering event) occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a secondary game triggering event (including a designated secondary game triggering event) occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a cascading symbol game triggering event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In different embodiments, a secondary game triggering event (including a designated secondary game triggering event) occurs based on a predefined variable reaching a defined parameter threshold. For example, when the 500,000$^{th}$ player has played an electronic gaming machine (ascertained from a player tracking system), one or more of such events or conditions occur. In different embodiments, the predefined parameter thresholds include a length of time, a length of time after a certain dollar amount is hit, a wager level threshold for a specific device (which electronic gaming machine is the first to contribute $250,000), a number of electronic gaming machines active, or any other parameter that defines a suitable threshold.

In different embodiments, a secondary game triggering event (including a designated secondary game triggering event) occurs based on a quantity of games played. In this embodiment, a quantity of games played is set for when one or more of such events or conditions will occur. In one embodiment, such a set quantity of games played is based on historic data.

In different embodiments, a secondary game triggering event (including a designated secondary game triggering event) occurs based on time. In this embodiment, a time is set for when one or more of such events or conditions will occur. In one embodiment, such a set time is based on historic data.

In different embodiments, a secondary game triggering event (including a designated secondary game triggering event) occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the electronic gaming machine. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In different embodiments, a secondary game triggering event (including a designated secondary game triggering event) occurs based on a system determination, including one or more random selections by the central controller. In one embodiment, as described above, the gaming system tracks all active electronic gaming machines and the wagers they placed. In one such embodiment, based on the electronic gaming machine's state as well as one or more wager pools associated with the electronic gaming machine, the gaming system determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments, a secondary game triggering event (including a designated secondary game triggering event) occurs based on a determination of if any numbers allotted to an electronic gaming machine match a randomly selected number. In this embodiment, upon or prior to each play of each electronic gaming machine, an electronic gaming machine selects a random number from a range of numbers and during each primary game, the electronic gaming machine allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a secondary game triggering event to occur may be implemented in accordance with the gaming system and method disclosed herein.

It should be appreciated that one or more of the above-described triggers pertaining to a secondary game triggering event (including a designated secondary game triggering event) occurring may be combined in one or more different embodiments.

Alternative Embodiments

It should be appreciated that in different embodiments, one or more of:

i. which primary games or types of primary games a player is enabled to simultaneously or concurrently play;
ii. a quantity of primary games a player is enabled to simultaneously or concurrently play;
iii. how the plurality of simultaneously or concurrently played primary games are displayed to a player;
iv. one or more paytables utilized for a play of one or more of the primary games;
v. one or more average expected payout percentages of a play of one or more of the primary games;
vi. one or more awards available for a play of one or more of the primary games;
vii. one or more ranges of awards available for a play of one or more of the primary games;
viii. one or more types of awards available for a play of one or more of the primary games;
ix. one or more generated outcomes (or one or more designated generated outcomes) for a play of one or more of the primary games;
x. one or more generated outcomes (or one or more designated generated outcomes) associated with an award over a designated value for a play of one or more of the primary games;
xi. which secondary games are available to be played in association with a designated secondary game triggering event;
xii. a quantity of secondary game triggered upon an occurrence of a designated secondary game triggering event;
xiii. which secondary games are triggered upon an occurrence of a designated secondary game triggering event;
xiv. one or more attributes or features one or more secondary games triggered upon an occurrence of a designated secondary game triggering event;
xv. which secondary games are associated with which primary games; and/or
xvi. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
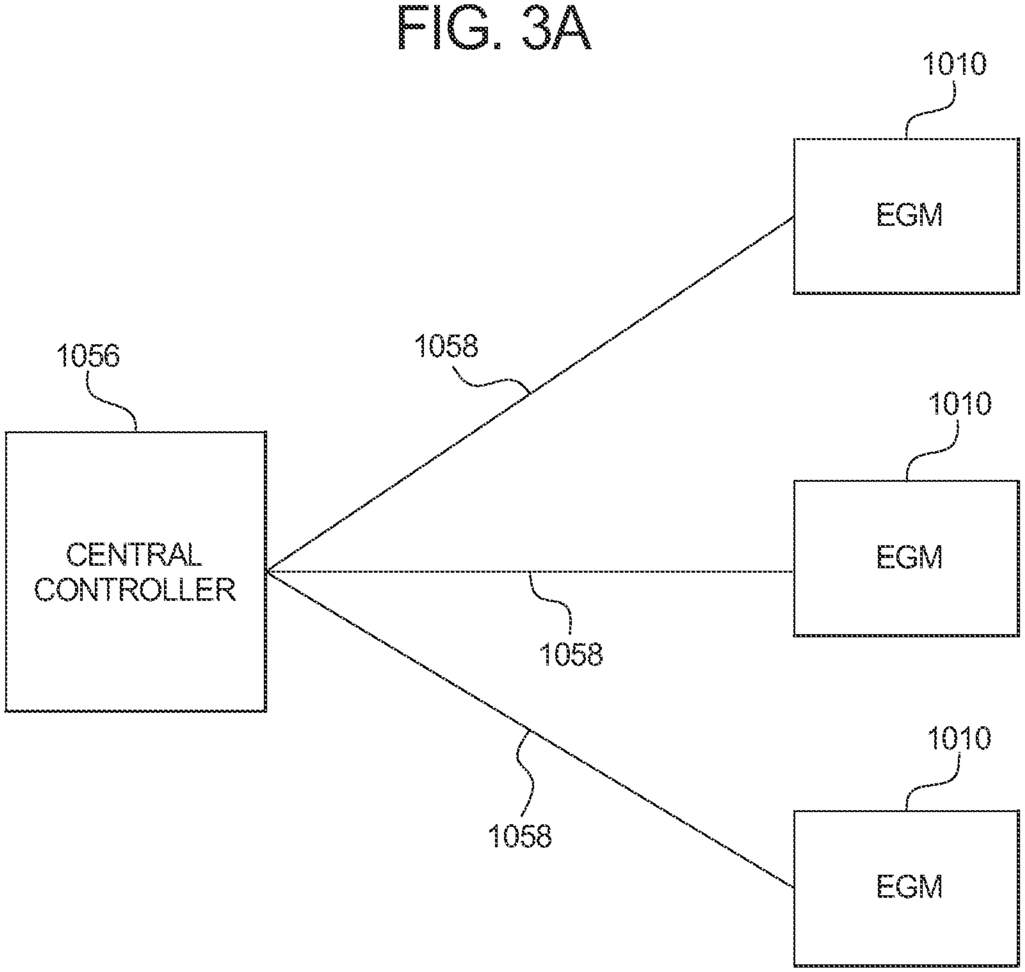
FIG. 3A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link, in certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by be at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such “thin client” embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such “thick client” embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
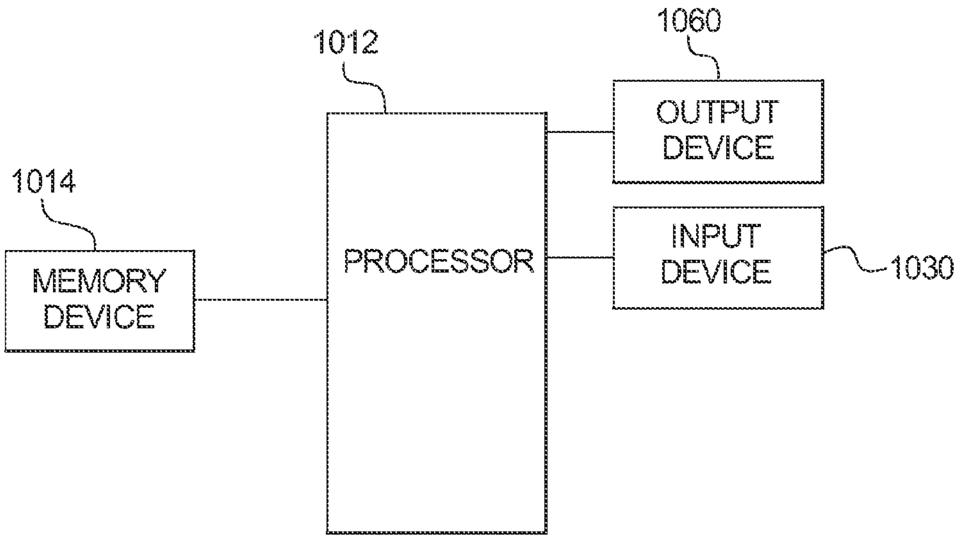
FIG. 3B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
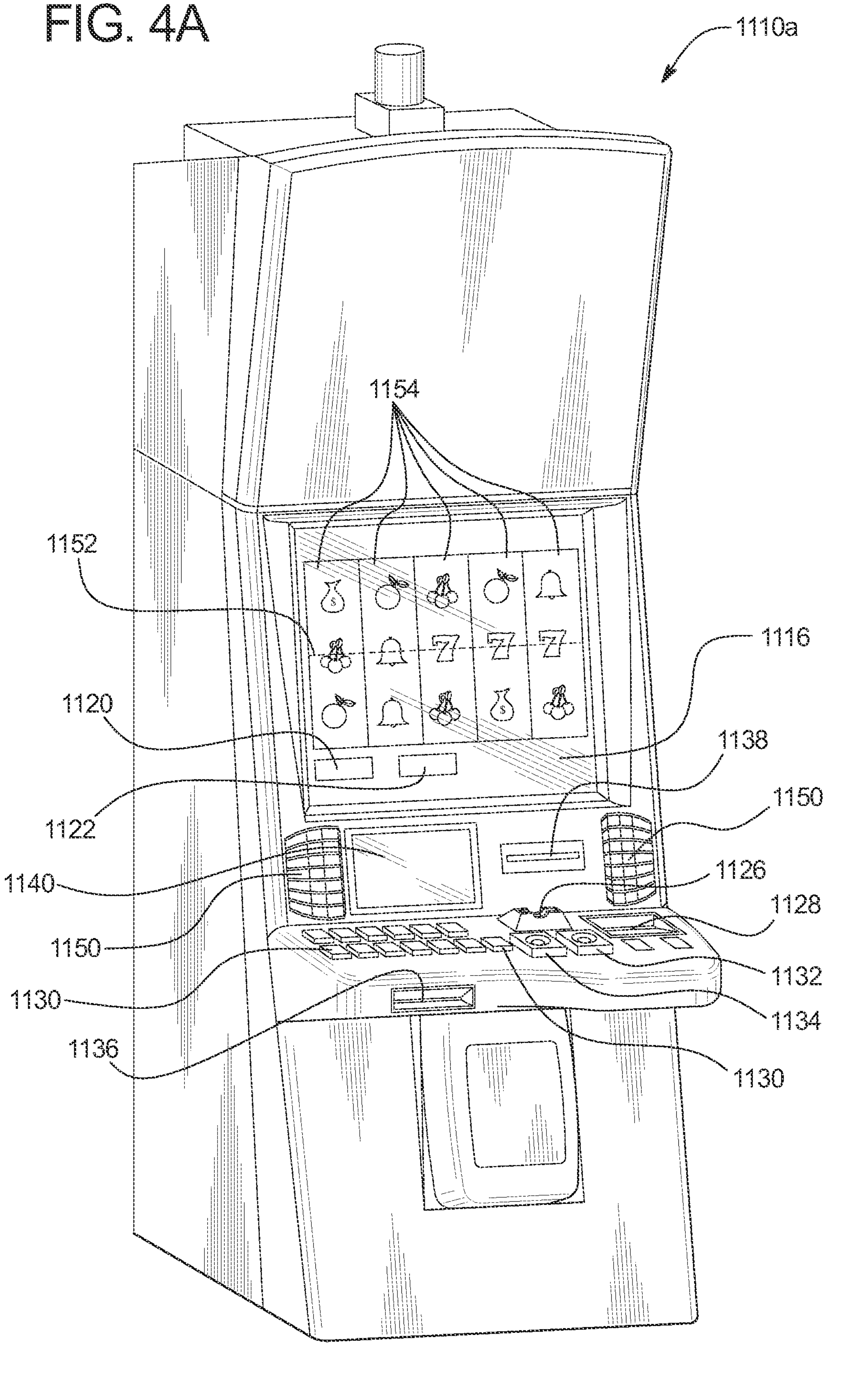
FIGS. 4A and 4B are perspective views of example alternative embodiments of the gaming system disclosed herein.
Figure 4B:
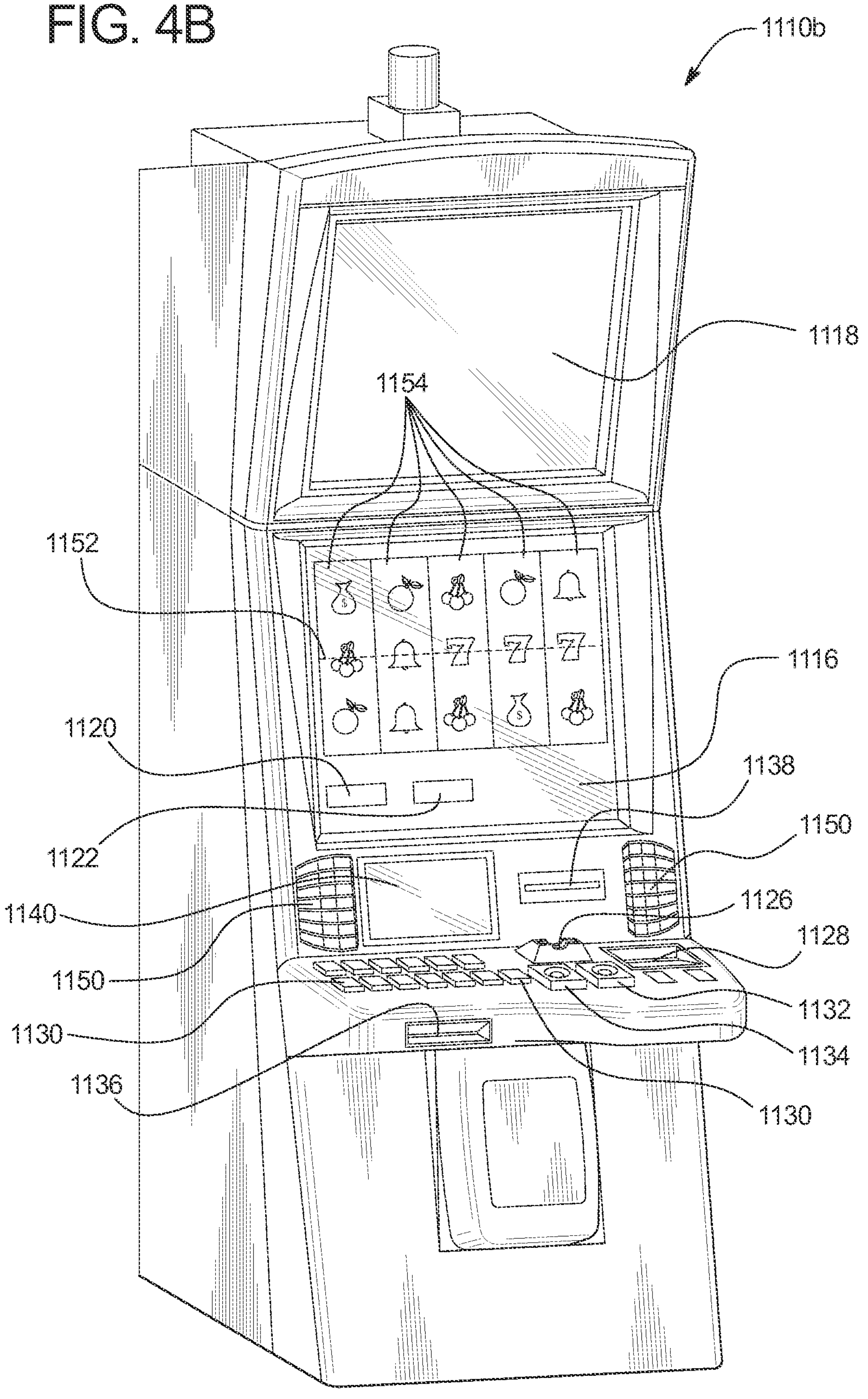

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281561 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1156. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780, 523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device including a first display device;

a plurality of input devices including an acceptor and a cashout device;

at least one processor; and at least one memory device which stores a plurality of instructions, which when executed by the at least one processor, cause the at least one processor to operate with the at least one display device and the plurality of input devices to:

(a) if a physical item is received via the acceptor, establish a credit balance based, at least in part, on a monetary value associated with the received physical item, (b) receive a wager on at least two overlapping plays of at least one of a plurality of primary games, (c) for each of the overlapping plays:

(i) determine a primary game outcome, (ii) cause the first display device to display the determined primary game outcome, (iii) determine any primary game award associated with the displayed primary game outcome, and (iv) display any determined primary game award, (d) if a first secondary game is triggered in association with a first one of the primary games:

(i) determine a first secondary game outcome, (ii) cause the first display device to display the determined first secondary game outcome, (iii) determine any first secondary game award associated with the displayed first secondary game outcome, and (iv) display any determined first secondary game award, wherein the first secondary game cannot be triggered in association with a second, different one of the primary games, (e) if a second secondary game is triggered in association with the second, different one of the primary games:

(i) determine a second secondary game outcome, (ii) cause the first display device to display the determined second secondary game outcome, (iii) determine any second secondary game award associated with the displayed second secondary game outcome, and (iv) display any determined second secondary game award, wherein the second secondary game cannot be triggered in association with the first one of the primary games, (f) if a third secondary game is triggered in association with one of: the first one of the primary games and the second one of the primary games:

(i) determine a third secondary game outcome, (ii) cause the first display device to display the determined third secondary game outcome, (iii) determine any third secondary game award associated with the displayed third secondary game outcome, and (iv) display any determined third secondary game award, and (g) if a cashout input is received via the cashout device, cause an initiation of any payout associated with the credit balance.

2. The gaming system of claim 1, wherein the at least two overlapping plays of the at least one of the plurality of primary games includes at least two wagered on plays of at least two different primary games.

3. The gaming system of claim 1, wherein each of the plurality of primary games are different.

4. The gaming system of claim 1, wherein at least one of the first secondary game is trigger, the second secondary game is triggered and the third secondary game is triggered independent of any occurrence in any play of any of the overlapping plays.

5. The gaming system of claim 1, wherein at least one of any determined primary game awards and any determined secondary game awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

6. A gaming system server comprising:

at least one processor; and at least one memory device which stores a plurality of instructions, which when executed by the at least one processor, cause the at least one processor to:

(a) receive data associated with a wager placed on at least two overlapping plays of at least one of a plurality of primary games, wherein a credit balance is decreasable based on the wager placed, said credit balance being increasable via an acceptor of a physical item associated with a monetary value, and said credit balance being decreasable via a received input of a cashout device, (b) for each of the overlapping plays:

(i) determine a primary game outcome, (ii) cause a first display device to display the determined primary game outcome, (iii) determine any primary game award associated with the displayed primary game outcome, and (iv) cause a display of any determined primary game award, (c) if a first secondary game is triggered in association with a first one of the primary games:

(i) determine a first secondary game outcome, (ii) cause the first display device to display the determined first secondary game outcome, (iii) determine any first secondary game award associated with the displayed first secondary game outcome, and (iv) cause a display of any determined first secondary game award, wherein the first secondary game cannot be triggered in association with a second, different one of the primary games, (d) if a second secondary game is triggered in association with the second, different one of the primary games:

(i) determine a second secondary game outcome, (ii) cause the first display device to display the determined second secondary game outcome, (iii) determine any second secondary game award associated with the displayed second secondary game outcome, and (iv) cause a display of any determined second secondary game award, wherein the second secondary game cannot be triggered in association with the first one of the primary games, and (e) if a third secondary game is triggered in association with one of: the first one of the primary games and the second one of the primary games:

(i) determine a third secondary game outcome, (ii) cause the first display device to display the determined third secondary game outcome, (iii) determine any third secondary game award associated with the displayed third secondary game outcome, and (iv) cause a display of any determined third secondary game award.

7. The gaming system server of claim 6, wherein the at least two overlapping plays of the at least one of the plurality of primary games includes at least two wagered on plays of at least two different primary games.

8. The gaming system server of claim 6, wherein each of the plurality of primary games are different.

9. The gaming system server of claim 6, wherein at least one of the first secondary game is trigger, the second secondary game is triggered and the third secondary game is triggered independent of any occurrence in any play of any of the overlapping plays.

10. The gaming system server of claim 6, wherein at least one of any determined primary game awards and any determined secondary game awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

11. A method of operating a gaming system, said method comprising:

(a) receiving data associated with a wager placed on at least two overlapping plays of at least one of a plurality of primary games, wherein a credit balance is decreasable based on the wager placed, said credit balance being increasable via an acceptor of a physical item associated with a monetary value, and said credit balance being decreasable via a received input of a cashout device, (b) for each of the overlapping plays:

(i) causing at least one processor to execute a plurality of instructions to determine a primary game outcome, (ii) causing a first display device to display the determined primary game outcome, (iii) causing the at least one processor to execute the plurality of instructions to determine any primary game award associated with the displayed primary game outcome, and (iv) causing a display of any determined primary game award, (c) if a first secondary game is triggered in association with a first one of the primary games:

(i) causing the at least one processor to execute the plurality of instructions to determine a first secondary game outcome, (ii) causing the first display device to display the determined first secondary game outcome, (iii) causing the at least one processor to execute the plurality of instructions to determine any first secondary game award associated with the displayed first secondary game outcome, and (iv) causing a display of any determined first secondary game award, wherein the first secondary game cannot be triggered in association with a second, different one of the primary games, (d) if a second secondary game is triggered in association with the second, different one of the primary games:

(i) causing the at least one processor to execute the plurality of instructions to determine a second secondary game outcome, (ii) causing the first display device to display the determined second secondary game outcome, (iii) causing the at least one processor to execute the plurality of instructions to determine any second secondary game award associated with the displayed second secondary game outcome, and (iv) causing a display of any determined second secondary game award, wherein the second secondary game cannot be triggered in association with the first one of the primary games, and (e) if a third secondary game is triggered in association with one of: the first one of the primary games and the second one of the primary games:

(i) causing the at least one processor to execute the plurality of instructions to determine a third secondary game outcome, (ii) causing the first display device to display the determined third secondary game outcome, (iii) causing the at least one processor to execute the plurality of instructions to determine any third secondary game award associated with the displayed third secondary game outcome, and (iv) causing a display of any determined third secondary game award.

12. The method of claim 11, wherein the at least two overlapping plays of the at least one of the plurality of primary games includes at least two wagered on plays of at least two different primary games.

13. The method of claim 11, wherein each of the plurality of primary games are different.

14. The method of claim 11, wherein at least one of the first secondary game is trigger, the second secondary game is triggered and the third secondary game is triggered independent of any occurrence in any play of any of the overlapping plays.

15. The method of claim 11, wherein at least one of any determined primary game awards and any determined secondary game awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

16. The method of claim 11, which is provided through a data network.

17. The method of claim 16, wherein the data network is an internet.

* * * * *